(12) United States Patent
Tong et al.

(10) Patent No.: US 12,481,404 B2
(45) Date of Patent: Nov. 25, 2025

(54) DISPLAY PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Kemeng Tong, Beijing (CN); Ming Hu, Beijing (CN); Cong Fan, Beijing (CN); Fan He, Beijing (CN); Xiangdan Dong, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beiling (CN)

( * ) Notice: Subject to any disclaimer, the term of this patent is extended or adjusted under 35 U.S.C. 154(b) by 0 days.

(21) Appl. No.: 18/038,987

(22) PCT Filed: Apr. 28, 2022

(86) PCT No.: PCT/CN2022/090049
§ 371 (c)(1),
(2) Date: May 26, 2023

(87) PCT Pub. No.: WO2023/206283
PCT Pub. Date: Nov. 2, 2023

(65) Prior Publication Data
US 2024/0353962 A1    Oct. 24, 2024

(51) Int. Cl.
*G06F 3/044*     (2006.01)
*G06F 3/041*     (2006.01)
(Continued)

(52) U.S. Cl.
CPC ............ *G06F 3/0445* (2019.05); *G06F 3/041* (2013.01); *G06F 3/0412* (2013.01);
(Continued)

(58) Field of Classification Search
CPC .... G06F 3/041; G06F 3/0412; G06F 3/04164; G06F 3/044; G06F 3/0443; G06F 3/0445;
(Continued)

(56) References Cited

U.S. PATENT DOCUMENTS 10,014,351 B2 *   7/2018  Ma ...................... H10K 59/131
10,795,472 B2 *  10/2020  Beak ................... H10K 59/131
(Continued)

FOREIGN PATENT DOCUMENTS

CN   108874256 A   11/2018
CN   112186011 A    1/2021
(Continued)

OTHER PUBLICATIONS

International Search Report and Written Opinion mailed on Nov. 24, 2022, in corresponding PCT/CN2022/090049, 9 pages.

*Primary Examiner* — Jason M Mandeville
(74) *Attorney, Agent, or Firm* — XSENSUS LLP

(57) ABSTRACT

A display panel includes a base substrate, a driving layer, a pixel layer and a touch layer stacked sequentially. In a peripheral area of the display panel, the driving layer is provided with a touch pin and a touch relay wire connected with the touch pin; the touch layer includes a touch organic layer and a touch metal layer buried in the touch organic layer, and the touch metal layer is formed with a touch channel and a touch wiring connected with the touch channel. The touch organic layer exposes the touch pin, and an end of the touch relay wire away from the touch pin extends between the touch organic layer and the base substrate. The touch wiring does not protrude out of the touch organic (Continued)

layer, and the touch wiring is electrically connected to the end of the touch relay wire away from the touch pin through a via hole.

18 Claims, 6 Drawing Sheets

(51) Int. Cl.
  *G06F 3/047* (2006.01)
  *H10K 59/131* (2023.01)
  *H10K 59/40* (2023.01)
(52) U.S. Cl.
  CPC .......... *G06F 3/04164* (2019.05); *G06F 3/044* (2013.01); *G06F 3/0443* (2019.05); *G06F 3/0446* (2019.05); *G06F 3/047* (2013.01); *H10K 59/131* (2023.02); *H10K 59/40* (2023.02); *G06F 2203/04111* (2013.01)
(58) Field of Classification Search
  CPC .................. G06F 3/0446; G06F 3/047; G06F 2203/04111; H10K 59/131; H10K 59/40
  USPC ........................................................ 345/174
  See application file for complete search history.

(56) References Cited

U.S. PATENT DOCUMENTS

| | | | |
|---|---|---|---|
| 11,144,145 B2* | 10/2021 | Lin | G06F 3/0443 |
| 2017/0179203 A1* | 6/2017 | Ma | G06F 3/0412 |
| 2018/0329552 A1* | 11/2018 | Song | G06F 3/04164 |
| 2021/0005676 A1 | 1/2021 | Park et al. | |
| 2021/0200364 A1* | 7/2021 | Won | G06F 3/0412 |
| 2022/0344441 A1* | 10/2022 | Lee | H10K 59/131 |
| 2024/0276808 A1* | 8/2024 | Fang | H10K 59/131 |

FOREIGN PATENT DOCUMENTS

| | | |
|---|---|---|
| CN | 112242431 A | 1/2021 |
| CN | 112313610 A | 2/2021 |
| CN | 112366220 A | 2/2021 |
| CN | 113130538 A | 7/2021 |
| CN | 113157143 A | 7/2021 |
| CN | 113224084 A | 8/2021 |
| CN | 108874256 B | 11/2021 |
| CN | 113964109 A | 1/2022 |
| CN | 215955281 U | 3/2022 |
| EP | 3764204 A1 | 1/2021 |
| WO | 2022/083315 A1 | 4/2022 |

* cited by examiner

DISPLAY PANEL AND DISPLAY DEVICE

CROSS-REFERENCE TO RELATED APPLICATIONS

The present application is the U.S. national phase application of PCT Application No. PCT/CN2022/090049, filed Apr. 28, 2022, the entire contents of which are incorporated herein by reference in their entirety.

TECHNICAL FIELD

This disclosure relates to the field of display technologies, and in particular, to a display panel and a display device.

BACKGROUND

The FMLOC (Flexible Metal Layer on Cell) process can combine the display module and the touch module, thereby effectively reducing the thickness and cost of the display panel. However, in a display panel using the FMLOC process, a short circuit between touch wirings is likely to cause a short-circuit defect.

It should be noted that the information disclosed in the above background section is only for enhancing the understanding of the background of this disclosure, and therefore may include information that does not constitute the prior art known to those of ordinary skill in the art.

SUMMARY

This disclosure is directed to overcome the shortcomings as mentioned in the above related art, and provides a display panel and a display device, thereby reducing the short-circuit faults between touch wirings.

According to an aspect of this disclosure, a display panel is provided and includes: a base substrate, a driving layer, a pixel layer and a touch layer stacked sequentially; in a peripheral area of the display panel, the driving layer is provided with a touch pin and a touch relay wire connected with the touch pin; the touch layer includes a touch organic layer and a touch metal layer buried in the touch organic layer, and the touch metal layer is formed with a touch channel and a touch wiring connected with the touch channel;

the touch organic layer exposes the touch pin, and an end of the touch relay wire away from the touch pin extends between the touch organic layer and the base substrate;
the touch wiring does not protrude from the touch organic layer, and the touch wiring is electrically connected to the end of the touch relay wire away from the touch pin through a via hole.

According to some embodiments of this disclosure, the touch organic layer includes a first touch organic layer, a second touch organic layer and a third touch organic layer sequentially stacked on a side of the pixel layer away from the base substrate; the touch metal layer includes a first touch metal layer sandwiched between the first touch organic layer and the second touch organic layer, and a second touch metal layer sandwiched between the second touch organic layer and the third touch organic layer.

According to some embodiments of this disclosure, the touch channel is formed on the second touch metal layer and the first touch metal layer; the touch wiring includes a first touch wiring and a second touch wiring connected with a same touch channel, the first touch wiring is located in the first touch metal layer, the second touch wiring is located in the second touch metal layer; an end of the first touch wiring away from the touch channel is electrically connected to the touch relay wire through a via hole, and an end of the second touch wiring away from the touch channel is electrically connected to the first touch wiring through a via hole.

According to some embodiments of this disclosure, the driving layer is provided with a common voltage bus between the touch pin and a display area of the display panel, and the common voltage bus is configured to load a common voltage to the pixel layer;

the via hole between the touch relay wire and the touch wiring is located between the common voltage bus and the touch pin.

According to some embodiments of this disclosure, the driving layer includes a source-drain metal layer and a passivation layer for protecting the source-drain metal layer;

the touch relay wire is located on the source-drain metal layer, and a part of the touch relay wire between the touch pin and the touch organic layer is covered by the passivation layer.

According to some embodiments of this disclosure, the source-drain metal layer includes a first source-drain metal layer and a second source-drain metal layer sequentially stacked on a side of the base substrate, and the passivation layer is located between the first source-drain metal layer and the second source-drain metal layer;

the touch relay wire is located on the first source-drain metal layer; the second source-drain metal layer includes transfer metal parts corresponding to respective touch relay wires one by one, and the end of the touch relay wire away from the touch pin is connected with a corresponding one of the transfer metal parts; and
an end of the touch wiring away from the touch channel is connected with the touch relay wire through the transfer metal part.

According to some embodiments of this disclosure, the transfer metal part is overlapped on the end of the touch relay wire away from the touch pin; and a part of the touch relay wire not overlapped with the transfer metal part is covered by the passivation layer.

According to some embodiments of this disclosure, the touch metal layer further includes pin protection parts corresponding to respective touch pins one by one, the pin protection part is overlapped and electrically connected with a corresponding one of the touch pins; and a gap exists between the pin protection part and an edge of the touch organic layer.

According to some embodiments of this disclosure, an orthographic projection of the touch pin on the base substrate is located within an orthographic projection of the pin protection part on the base substrate.

According to some embodiments of this disclosure, the touch organic layer includes a first touch organic layer, a second touch organic layer and a third touch organic layer sequentially stacked on a side of the pixel layer away from the base substrate; the touch metal layer includes a first touch metal layer sandwiched between the first touch organic layer and the second touch organic layer, and a second touch metal layer sandwiched between the second touch organic layer and the third touch organic layer;

the pin protection part includes a first pin protection part located on the first touch metal layer and a second pin protection part located on the second touch metal layer;
an orthographic projection of the touch pin on the base substrate is located within an orthographic projection of the first pin protection part on the base substrate; and the orthographic projection of the first pin protection part on the base substrate is located within an orthographic projection of the second pin protection part on the base substrate.

According to some embodiments of this disclosure, the second touch organic layer is not provided between the first pin protection part and the second pin protection part; and the first touch organic layer is not provided between the first pin protection part and the touch pin.

According to some embodiments of this disclosure, the source-drain metal layer includes a first source-drain metal layer and a second source-drain metal layer sequentially stacked on a side of the base substrate, the passivation layer is located between the first source-drain metal layer and the second source-drain metal layer; and the touch pin and the touch relay wire are located in the first source-drain metal layer;

the second source-drain metal layer includes laminated metal parts corresponding to respective touch pins one by one, and the laminated metal part is overlapped and electrically connected with a corresponding one of the touch pins.

According to some embodiments of this disclosure, an orthographic projection of the touch pin on the base substrate is located within an orthographic projection of the laminated metal part on the base substrate.

According to some embodiments of this disclosure, the driving layer further includes a planarization layer located on a side of the second source-drain metal layer away from the base substrate; and the planarization layer covers a gap between the laminated metal part and a boundary of the touch organic layer.

According to some embodiments of this disclosure, a part of the touch organic layer covering the touch relay wire is directly formed on a surface of the planarization layer away from the base substrate.

According to some embodiments of this disclosure, the touch metal layer further includes pin protection parts corresponding to respective touch pins one by one, and the pin protection part is overlapped and electrically connected with a corresponding one of the touch pins through the laminated metal part;

a gap exists between the pin protection part and an edge of the touch organic layer, and a part of the pin protection part close to the touch organic layer is overlapped on the planarization layer.

According to some embodiments of this disclosure, the touch metal layer further includes pin protection parts corresponding to respective touch pins one by one, and the pin protection part is overlapped and electrically connected with a corresponding one of the touch pins through the laminated metal part; and an orthographic projection of the laminated metal part on the base substrate is located within an orthographic projection of the pin protection part on the base substrate.

According to some embodiments of this disclosure, the display panel further includes a thin-film encapsulation layer located between the pixel layer and the touch layer, the thin-film encapsulation layer includes an inorganic encapsulation layer and an organic encapsulation layer stacked alternately, and the thin-film encapsulation layer includes at least one organic encapsulation layer and at least two inorganic encapsulation layers.

According to another aspect of this disclosure, a display device is provided, including the display panel as described above.

It is to be understood that both the foregoing general description and the following detailed description are exemplary and explanatory only and are not restrictive of this disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure. Apparently, the drawings in the following description are only some embodiments of this disclosure, and those skilled in the art can obtain other drawings according to these drawings without creative efforts.

DETAILED DESCRIPTION

Figure 1:
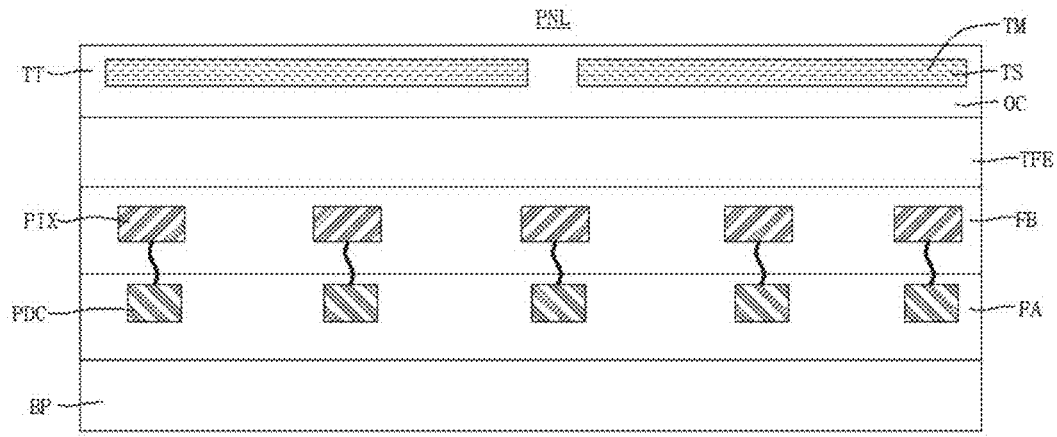
FIG. 1 is a schematic structural diagram of a display panel according to some embodiments of this disclosure.

Exemplary embodiments will now be described more fully with reference to the accompanying drawings. Exemplary embodiments may, however, be implemented in many forms and should not be construed as limited to the embodiments set forth herein. Instead, these embodiments are provided so that this disclosure will be thorough and complete, and will fully convey the concept of exemplary embodiments to those skilled in the art. The same reference numerals in the drawings denote the same or similar structures, and thus their detailed descriptions will be omitted. Furthermore, the drawings are merely schematic illustrations of this disclosure and are not necessarily drawn to scale.

Although relative terms such as "upper" and "lower" are used in this specification to describe the relative relationship of one component as illustrated to another component, these terms are used in this specification only for convenience, for example, according to the directions as illustrated in the accompanying drawings. It should be understood that if the illustrated device is turned over so that it is upside down, then elements described as being "upper" may become elements that are "lower". When a structure is "on" another structure, it may mean that the structure is integrally formed on another structure. or that the structure is "directly" placed on another structure, or that the structure is "indirectly" placed on another structure through still another structure.

The terms "a", "an", "the", "said" and "at least one" are used to indicate the presence of one or more elements/components and the like. The terms "include" and "have" are used to indicate a non-exclusive inclusion and mean that there may be additional elements/components and the like in addition to the listed elements/components and the like. The terms "first", "second", "third" and the like are only used as markers, without limiting the number of objects related thereto.

When referring to a structural layer A is located on a side of a structural layer B away from the base substrate, it may be understood that the structural layer A is formed on the side of the structural layer B away from the base substrate. When the structural layer B is a patterned structure, a partial structure of the structural layer A may also be located at the same physical height of the structural layer B or lower than the physical height of the structural layer B, where the base substrate is deemed as the height reference.

This disclosure provides a display panel. Referring to FIG. 1, the display panel PNL according to some embodiments of this disclosure includes a base substrate BP, a driving layer FA, a pixel layer FB and a touch layer TT which are sequentially stacked. In some embodiments, the pixel layer FB is provided with sub-pixels for displaying, the driving layer FA is provided with a pixel driving circuit PDC for driving sub-pixels, and the touch layer TT is provided with a touch channel TS for realizing touch control.

In some embodiments of this disclosure, the base substrate BP may be a flexible base substrate, and its material may include a flexible organic material, for example, may include one or more polyimide layers. In this way, the display panel PNL of this disclosure may be a flexible display panel PNL or a bendable display panel PNL, and the display panel may be applied to a bendable display device or a polygonal curved display device, such as a bendable mobile phone or a quadrilateral mobile phone. In some other embodiments of this disclosure, the display panel PNL may also be a rigid display panel PNL, and accordingly, the base substrate BP may be made of an inorganic material such as glass or metal, or an organic material with high hardness.

Figure 2:
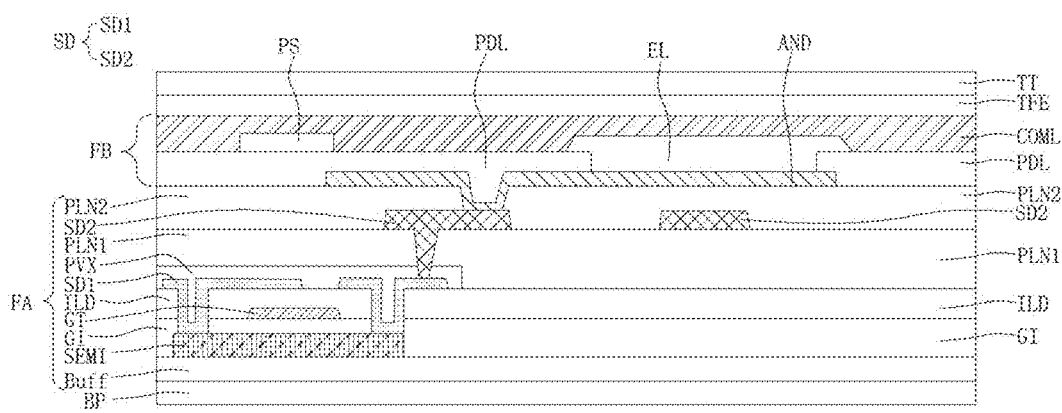
FIG. 2 is a schematic structural diagram of a display panel according to some embodiments of this disclosure.

FIG. 2 is a schematic diagram illustrating a partial structure of a display panel PNL according to some embodiments of this disclosure. Referring to FIG. 1 and FIG. 2, the driving layer FA is provided with a pixel driving circuit PDC for driving sub-pixels. In the driving layer FA, any pixel driving circuit PDC may include a transistor and a storage capacitor. Further, the transistor may be a thin film transistor (TFT), and the TFT may be selected from a top gate TFT, a bottom gate TFT or a double gate TFT. The material of the active layer of the TFT may include amorphous silicon semiconductor materials, low temperature polysilicon semiconductor materials, metal oxide semiconductor materials, organic semiconductor materials or other types of semiconductor materials. The TFT may be an N-type TFT or a P-type TFT.

It may be understood that, among the transistors in the pixel driving circuit PDC, the types of any two transistors may be the same or different. Exemplarily, according to some embodiments, in a pixel driving circuit PDC, some transistors may be N-type transistors and some transistors may be P-type transistors. As another example, according to some other embodiments of this disclosure, in a pixel driving circuit PDC, the material of the active layer of some transistors may be the low-temperature polysilicon semiconductor material, and the material of the active layer of some transistors may be the metal oxide semiconductor material. In some embodiments of this disclosure, the TFTs are low temperature polysilicon transistors. In other embodiments of this disclosure, part of the TFTs are low temperature polysilicon transistors, and part of the TFTs are metal oxide transistors.

Optionally, the driving layer FA may include a semiconductor layer SEMI, a gate insulating layer GI, a gate layer GT, an interlayer dielectric layer ILD, and a source-drain metal layer SD and the like stacked between the base substrate BP and the pixel layer FB. Each TFT and storage capacitor may be formed of film layers such as the semiconductor layer SEMI, gate insulating layer GI, gate layer GT, interlayer dielectric layer ILD, and source-drain metal layer SD. In some embodiments, the positional relationship of respective film layers may be determined according to the film layer structure of the TFT. Further, the semiconductor layer SEMI may be used to form the channel region of the transistor; the gate layer may be used to form gate layer wirings such as scanning wiring, reset control wiring, and light emission control wiring, may also be used to form gate of a transistor, and may also be used to form part or all of the electrode plates of the storage capacitor; the source-drain metal layer may be used to form wirings of the source-drain metal layer such as data voltage wiring and driving voltage wiring, and may also be used to form part of the electrode plates of the storage capacitor.

In one example, the driving layer FA may include a semiconductor layer SEMI, a gate insulating layer GI, a gate layer GT, an interlayer dielectric layer ILD, and a source-drain metal layer SD that are sequentially stacked, so that the TFT formed in this way is a top gate TFT.

In another example, the driving layer FA may include a gate layer GT, a gate insulating layer GI, a semiconductor layer SEMI, an interlayer dielectric layer ILD, and a source-drain metal layer SD that are sequentially stacked, and the TFT thus formed is a bottom gate TFT.

In the display panel PNL according to some embodiments of this disclosure, the gate layer may be formed in one layer, or two or three layers as required. In one example, the gate layer GT may include a first gate layer and a second gate layer, and the gate insulating layer GI may include a first gate insulating layer for isolating the semiconductor layer SEMI from the first gate layer, and a second gate insulating layer for isolating the first gate layer from the second gate layer. For example, the driving layer FA may include a semiconductor layer SEMI, a first gate insulating layer, a first gate layer, a second gate insulating layer, a second gate layer, an interlayer dielectric layer ILD and a source-drain metal layer SD that are sequentially stacked on one side of the base substrate BP. In one example, the gate layer GT may include a first gate layer and a second gate layer, and the semiconductor layer SEMI may be sandwiched between the first gate layer and the second gate layer; the gate insulating layer GI may include the first gate insulating layer for isolating the semiconductor layer SEMI from the first gate layer, and the second gate insulating layer for isolating the second gate layer from the semiconductor layer SEMI. For example, the driving layer FA may include a first gate layer, a first gate insulating layer, a semiconductor layer SEMI, a second gate insulating layer, a second gate layer, an interlayer dielectric layer ILD and a source-drain metal layer SD that are sequentially stacked on one side of the base substrate BP. In this way, a transistor having a double gate structure may be formed. In one example, the semiconductor layer SEMI may include a low-temperature polysilicon semiconductor layer and a metal oxide semiconductor layer; the gate layer includes a first gate layer and a second gate layer, and the gate insulating layer includes first to third gate insulating layers. The driving layer FA may include a low-temperature polysilicon semiconductor layer, a first gate insulating layer, a first gate layer, a second gate insulating layer, a metal oxide semiconductor layer, a third gate insulating layer, a second gate layer, an interlayer dielectric layer ILD, and a source-drain metal layer SD that are sequentially stacked on one side of the base substrate BP. In one example, the semiconductor layer SEMI may include a low temperature polysilicon semiconductor layer and a metal oxide semiconductor layer; the gate layer includes first to third gate layers, and the gate insulating layer includes first to third gate insulating layers. The driving layer FA may include a low-temperature polysilicon semiconductor layer, a first gate insulating layer, a first gate layer, an insulating buffer layer, a second gate layer, a second gate insulating layer, a metal oxide semiconductor layer, a third gate insulating layer, a third gate layer, an interlayer dielectric layer ILD and a source-drain metal layer SD that are sequentially stacked on one side of the base substrate BP.

In the display panel PNL according to some embodiments of this disclosure, the source-drain metal layer may be formed in one layer, or two or three layers as required. In one example, the source-drain metal layer may include a first source-drain metal layer and a second source-drain metal layer sequentially stacked on the side of the interlayer dielectric layer ILD away from the base substrate, where an insulating layer, for example, a passivation layer and/or a planarization layer, may be sandwiched between the first source-drain metal layer and the second source-drain metal layer. In another example, the source-drain metal layer may include a first source-drain metal layer, a second source-drain metal layer, and a third source-drain metal layer sequentially stacked on the side of the interlayer dielectric layer ILD away from the base substrate; where an insulating layer, for example, a passivation layer and/or a resin layer, may be sandwiched between the first source-drain metal layer and the second source-drain metal layer, and another insulating layer, for example, a passivation layer and/or a planarization layer, may be sandwiched between the second source-drain metal layer and the third source-drain metal layer.

Optionally, the driving layer FA may further include a passivation layer, and the passivation layer may be disposed on the surface of the source-drain metal layer SD away from the base substrate BP, so as to protect the source-drain metal layer SD.

Optionally, the driving layer FA may further include a buffer material layer Buff disposed between the base substrate BP and the semiconductor layer SEMI, and the semiconductor layer SEMI, the gate layer GT, and the like are all located on the side of the buffer material layer away from the base substrate BP. The material of the buffer material layer may be inorganic insulating materials such as silicon oxide and silicon nitride. The buffer material layer may be formed in one layer of inorganic material, or an inorganic material layer stacked by multiple layers.

Optionally, the driving layer FA may further include a planarization layer located between the source-drain metal layer SD and the pixel layer FB, and the planarization layer may provide a planarized surface for the pixel electrode. Optionally, the material of the planarization layer PLN may be an organic material.

FIG. 2 illustrates only an example of the driving layer FA of the display panel PNL according to some embodiments of this disclosure. In this example, the source-drain metal layer SD includes a first source-drain metal layer SDI and a second source-drain metal layer SD2; a passivation layer PVX and a first planarization layer PLN1 are sandwiched between the first source-drain metal layer SD1 and the second source-drain metal layer SD2, and a second planarization layer PLN2 is provided on the side of the second source-drain metal layer SD2 away from the base substrate BP. It may be understood that the driving layer FA of the display panel PNL according to some embodiments of this disclosure may also adopt other structures.

In some embodiments of this disclosure, the source-drain metal layer SD may include one or more metal layers stacked, and the metal layer may be a single metal layer or an alloy layer. For example, in one example, the source-drain metal layer SD (e.g., the first source-drain metal layer SDI or the second source-drain metal layer SD2) may include three layers of metal layers such as titanium, aluminum and titanium that are stacked. In another example, the source-drain metal layer SD (e.g., the first source-drain metal layer SD1 or the second source-drain metal layer SD2) may include molybdenum-niobium alloy layer/copper layer/molybdenum-niobium alloy layer that are stacked.

Referring to FIG. 1, the pixel layer FB may be provided with light emitting elements electrically connected to the pixel driving circuit PDC correspondingly, and the light emitting elements may serve as sub-pixels PIX of the display panel PNL. In this way, the pixel layer FB is provided with light emitting elements distributed in an array, and each light emitting element emits light under the control of the pixel driving circuit PDC. In this disclosure, the light-emitting element may be an organic light-emitting diode (OLED), a polymer organic light-emitting diode (PLED), a micro light-emitting diode (Micro LED), a quantum dot-organic light-emitting diode (QD-OLED), a quantum dot light emitting diode (QLED) or other types of light emitting elements. Exemplarily, the light emitting element is an organic light emitting diode (OLED), and the display panel PNL is an OLED display panel PNL. As follows, taking the organic electroluminescent diode as an example of the light emitting element, a possible structure of the pixel layer FB is exemplarily introduced.

In this example, the pixel layer FB may be arranged on the side of the driving layer FA away from the base substrate BP, which may include a pixel electrode layer AND, a pixel definition layer PDL, a support pillar layer PS, and an organic light-emitting functional layer EL and a common electrode layer COML that are stacked in sequence. In some embodiments, the pixel electrode layer AND has a plurality of pixel electrodes in the display area of the display panel PNL; the pixel definition layer PDL has a plurality of penetrating pixel openings in the display area corresponding to the plurality of pixel electrodes one by one, and any one of pixel openings exposes at least a partial area of the corresponding pixel electrode. The support pillar layer PS includes a plurality of support pillars in the display area, and the support pillars are located on the surface of the pixel definition layer PDL away from the base substrate BP, so as to support a fine metal mask (FMM) during the evaporation process. The organic light-emitting functional layer EL covers at least the pixel electrodes exposed by the pixel definition layer PDL. In some embodiments, the organic light-emitting functional layer EL may include an organic electroluminescent material layer, and may include one or more of a hole injection layer, a hole transport layer, an electron blocking layer, a hole blocking layer, an electron transport layer, and an electron injection layer. Each film layer of the organic light-emitting functional layer EL may be prepared by an evaporation process, and an FMM or an open mask may be used to define the pattern of each film layer during evaporation. The common electrode layer COML may cover the organic light-emitting functional layer EL in the display area. In this way, the pixel electrode, the common electrode layer COML and the organic light-emitting functional layer EL between the pixel electrode and the common electrode layer COML form an organic light-emitting diode, and any one of organic light-emitting diodes may serve as a sub-pixel of the display panel PNL.

Optionally, the pixel layer FB may further include a light extraction layer located on the side of the common electrode layer COML away from the base substrate BP, so as to enhance the light extraction efficiency of the organic light emitting diode.

In some embodiments of this disclosure, referring to FIG. 1 and FIG. 2, the display panel PNL may further include a thin-film encapsulation layer TFE. The thin-film encapsulation layer TFE is disposed on the surface of the pixel layer FB away from the base substrate BP, and may include an inorganic encapsulation layer and an organic encapsulation layer that are alternately stacked. The touch layer TT is disposed on the side of the thin-film encapsulation layer TFE away from the base substrate BP. In some embodiments, the inorganic encapsulation layer can effectively block external moisture and oxygen, and prevent material degradation caused by moisture and oxygen invading the organic light-emitting functional layer EL. Optionally, an edge of the inorganic encapsulation layer may be located in the peripheral area. The organic encapsulation layer may be located between two adjacent inorganic encapsulation layers, so as to realize planarization and weaken the stress between the inorganic encapsulation layers. In some embodiments, an edge of the organic encapsulation layer may be located between an edge of the display area and the edge of the inorganic encapsulation layer.

Figure 3:
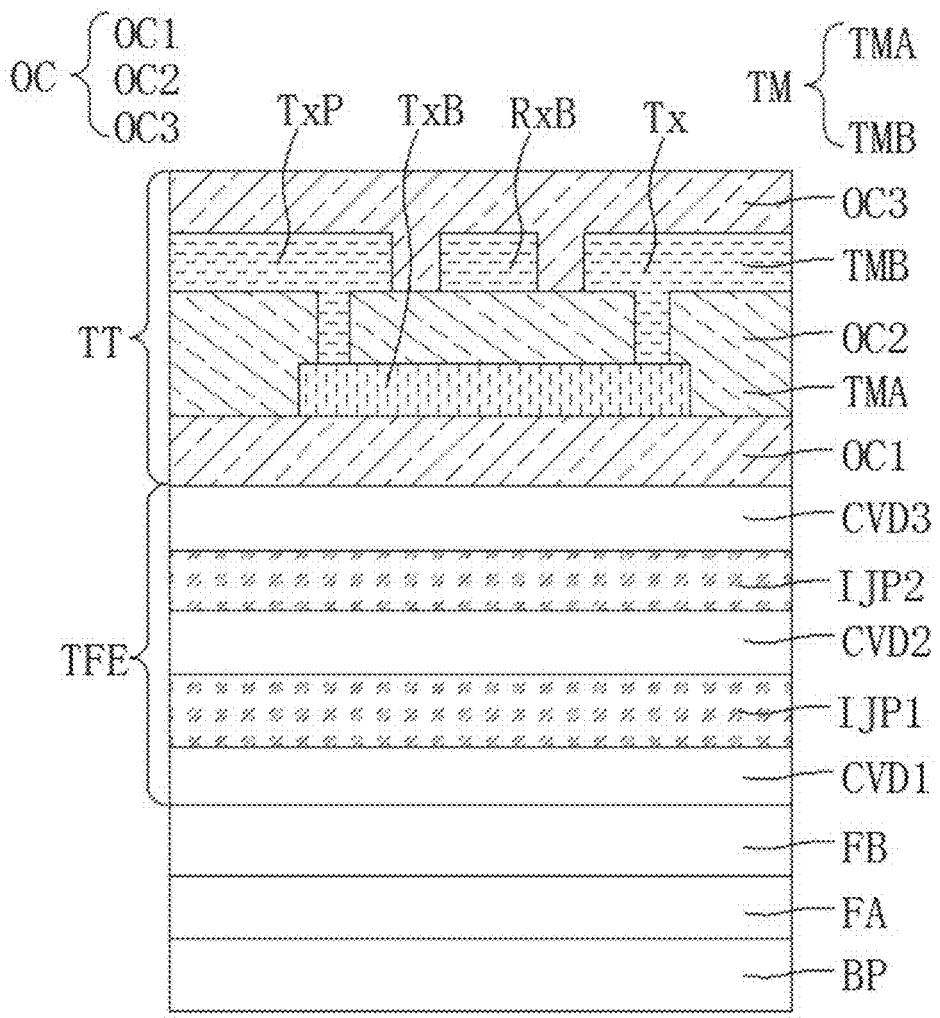
FIG. 3 is a schematic structural diagram of a display panel according to some embodiments of this disclosure.

FIG. 3 illustrates a schematic structural view of the thin-film encapsulation layer TFE according to some embodiments. The thin-film encapsulation layer TFE includes inorganic encapsulation layers and organic encapsulation layers that are alternately stacked, and the organic encapsulation layer is sandwiched between two adjacent inorganic encapsulation layers. In some embodiments, the film layers closest to and farthest from the base substrate are inorganic encapsulation layers; the edge of the inorganic encapsulation layer exceeds the edge of the organic encapsulation layer, so that the organic encapsulation layer is sealed by the inorganic encapsulation layer. Thus, the thin-film encapsulation layer includes at least one organic encapsulation layer and at least two inorganic encapsulation layers. In some embodiments of this disclosure, the thin-film encapsulation layer TFE includes at least two organic encapsulation layers, and at least three inorganic encapsulation layers. In the example of FIG. 3, the thin-film encapsulation layer TFE includes a first inorganic encapsulation layer CVD1, a first organic encapsulation layer IJP1, a second inorganic encapsulation layer CVD2, a second organic The encapsulation layer IJP2 and the third inorganic encapsulation layer CVD3 that are sequentially stacked on the side of the pixel layer FB away from the base substrate BP. In this way, by adding or reducing new inorganic encapsulation layers and organic encapsulation layers, not only can the encapsulation effect be improved, but also the stress distribution of the display panel PNL when it is bent may be adjusted, thereby meeting the stress requirement of the display panel PNL during its large-angle folding by cooperating with the touch layer TT.

Referring to FIG. 1, the touch control layer TT includes a touch organic layer OC and a touch metal layer TM buried in the touch organic layer OC, and the touch metal layer TM is formed with a touch channel TS and a touch wiring TSW connected with the touch channel TS. In this way, the touch channel TS can generate a touch signal in response to touch operation of a touch object such as a finger, and the touch signal may be transmitted to a control module through the touch wiring TSW to locate the touch position. According to some embodiments of this disclosure, referring to FIG. 1, the touch metal layer TM in the touch layer TT is buried in the touch organic layer OC, which makes the content of organic matter in the touch layer TT high, thereby making the display panel PNL have a greater flexibility and bendability, which is beneficial to realize large-angle bending.

Furthermore, through the cooperation with the touch layer TT and the thin-film encapsulation layer TFE, the stress distribution of the display panel PNL during its large-angle bending may be adjusted, for example, the maximum stress and the neutral layer of the display panel PNL during its large-angle bending may be adjusted, thereby satisfying the stress requirement of the display panel PNL during its large-angle bending.

In some embodiments of this disclosure, referring to FIG. 3, the touch organic layer OC includes a first touch organic layer OC1, a second touch organic layer and the third touch organic layer OC3 that are sequentially stacked on the side of the pixel layer FB away from the base substrate BP. The touch metal layer TM includes a first touch metal layer TMA sandwiched between the first touch organic layer OC1 and the second touch organic layer OC2, and a second touch metal layer TMB sandwiched between the second touch organic layer OC2 and the third touch organic layer OC3. In this way, the touch metal layer TM has two layers of metal to facilitate the formation of two kinds of touch channels TS with intersecting directions.

In some embodiments of this disclosure, the touch metal layer TM may include one or more metal layers stacked, and the metal layer may be a single metal layer or an alloy layer. For example, in some embodiments, the touch metal layer TM (e.g., the first touch metal layer TMA or the second touch metal layer TMB) may include three stacked metal layers such as titanium, aluminum and titanium. In another example, the touch metal layer TM (e.g., the first touch metal layer TMA or the second touch metal layer TMB) may include a molybdenum-niobium alloy layer/copper layer/molybdenum-niobium alloy layer that are stacked.

In one example, the material of at least one layer of the touch organic layer OC is optical glue, for example, at least one layer of the first touch organic layer OC1, the second touch organic layer OC2 and the third touch organic layer OC3 is the optical glue. Further, when preparing the touch organic layer OC, a low temperature process may be used for preparation. Optionally, the materials of the first touch organic layer OC1, the second touch organic layer OC2 and the third touch organic layer OC3 are optical glue.

Figure 4:
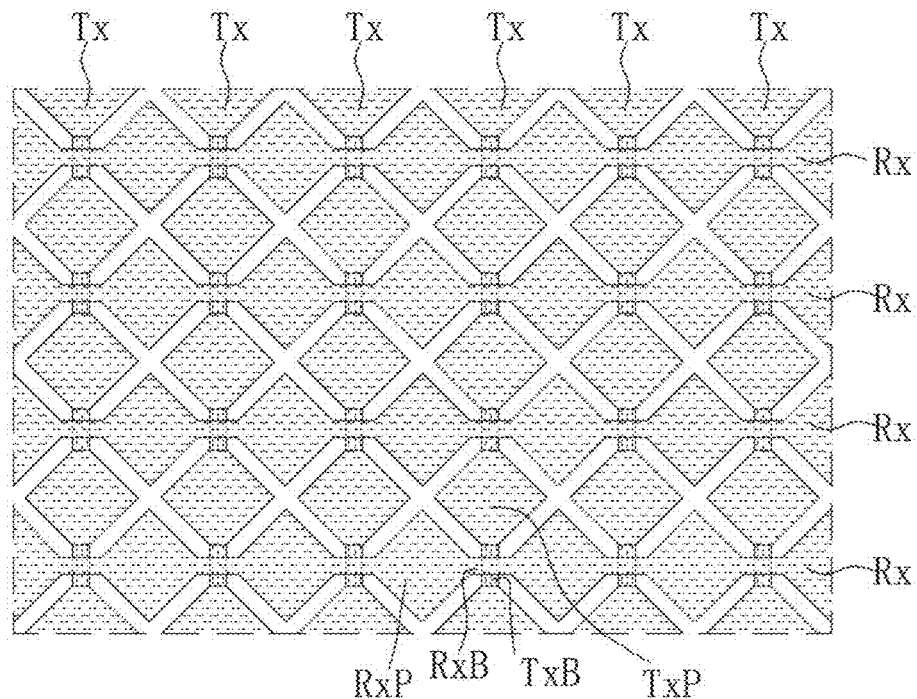
FIG. 4 is a schematic structural diagram of a touch metal layer according to some embodiments of this disclosure.

FIG. 4 illustrates a schematic structural diagram of the touch metal layer TM according to some embodiments of this disclosure. Referring to FIG. 3 and FIG. 4, the touch metal layer TM of the touch layer TT is formed with a plurality of touch channels TS, and these touch channels TS include a plurality of second signal channels RX extending along a second direction DH (see FIG. 5) and a plurality of first signal channels Tx extending along a first direction DV (see FIG. 5), where the second direction DH intersects with the first direction DV. In one example, one of the second direction DH and the first direction DV is the row direction (the direction in which the scan lines extend) of the display panel PNL, and the other is the column direction (the direction in which the data voltage lines extend) thereof. Exemplarily, the second direction DH is the row direction of the display panel PNL, and the first direction DV is the column direction of the display panel PNL.

Referring to FIG. 3 and FIG. 4, in this example, the second signal channel Rx has a plurality of second signal electrodes RxP sequentially arranged along the second direction DH in the second touch metal layer TMB, and two adjacent second signal electrodes RxP are electrically connected through a connecting part RxB located in the second touch metal layer TMB; the first signal channel Tx has a plurality of first signal electrodes TxP sequentially arranged long the first direction DV in the second touch metal layer TMB, a plurality of bridging parts TxB are disposed on the first touch metal layer TMA, and two adjacent first signal electrodes TxP are electrically connected through the bridging part TxB. In some embodiments, at the intersection of the first signal channel Ty and the second signal channel Rx, the bridging part TyB and the connecting part RxB partially overlap, so that the second signal channel Rx remains continuous in the second touch metal layer TMB, and the first signal channels Tx are bridged by the first touch metal layer TMA. Respective first signal channels Tx and respective second signal channels Rx define a plurality of touch positioning areas distributed in an array. The touch capacitor is formed by mutual capacitance between the first signal channel Tx and the second signal channel Rx in the touch positioning area. Upon a touching operation, the capacitance value of the touch capacitor in the touch positioning area may change in response to the touch object (e.g., a finger), so that the touch signal is generated through the first signal channel Tx and the second signal channel Rx in the touch positioning area. The touch position may be determined by detecting the first signal channel Tx and the second signal channel Rx that generate the touch signal.

Figure 5:
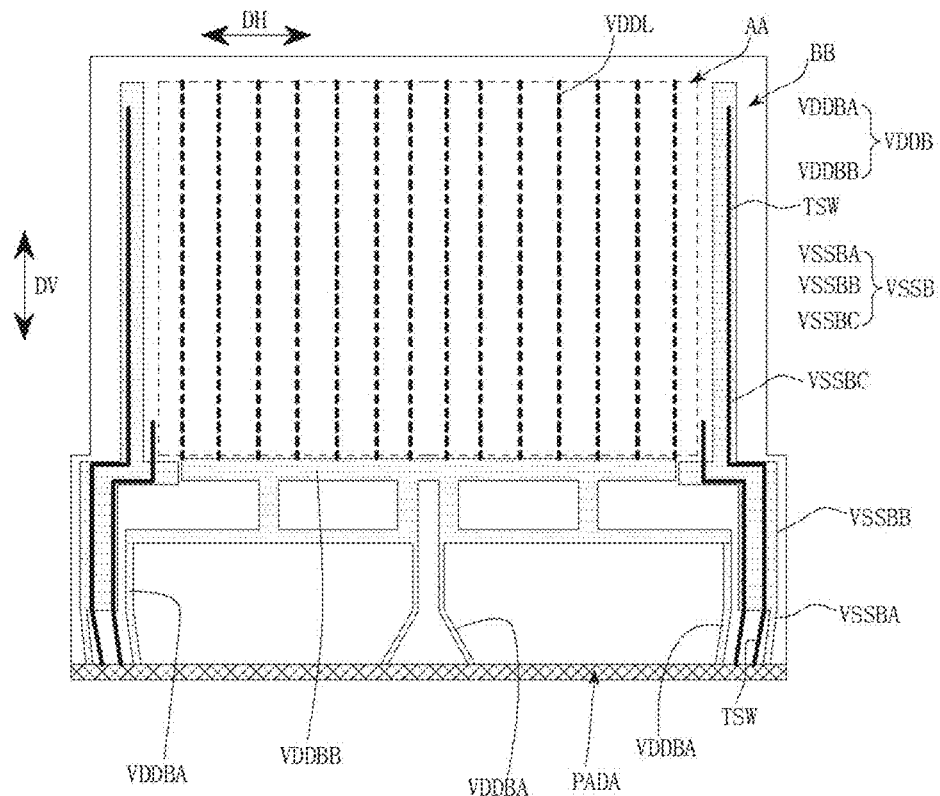
FIG. 5 is a schematic structural diagram of a display panel according to some embodiments of this disclosure.

Referring to FIG. 5, according to some embodiments of this disclosure, the display panel PNL may include a display area AA and a peripheral area BB located on at least one side of the display area AA, for example, the peripheral area BB surrounds the display area AA. In the display area AA, sub-pixels PIX and a pixel driving circuit PDC for driving the sub-pixels PIX are provided, so that the display panel PNL displays images in the display area AA. In the peripheral area BB, the driving layer FA is provided with a driving voltage bus VDDB for applying a driving voltage to the display area AA and a common voltage bus VSSB for applying a common voltage to the display area AA. In some embodiments of this disclosure, the touch wiring TSW connected with the touch channel TS may also be at least partially disposed in the peripheral area BB, for example, completely disposed in the peripheral area BB.

Referring to FIG. 5, the peripheral area BB is provided with a pin area PADA, and the driving layer FA is provided with pins in the pin area PADA that are bound and connected with the control module. In one example, the driving voltage bus VDDB includes a driving voltage access line VDDBA and a driving voltage distribution line VDDBB between the pin area PADA and the display area AA, and the display are AA is provided with a driving voltage wiring VDDL for applying the driving voltage to the pixel driving circuit PDC. In some embodiments, one end of the driving voltage access line VDDBA is connected with a driving voltage pin located in the pin area PADA, and the other end is connected with a driving voltage distribution line VDDBB arranged near the display area AA; and the driving voltage wiring VDDL extends to the peripheral area BB and is connected to the driving voltage distribution line VDDBB. In this way, the driving voltage loaded on the driving voltage pin may be loaded on the driving voltage wiring VDDL through the driving voltage access line VDDBA and the driving voltage distribution line VDDBB. In one example, the common voltage bus VSSB may include a common voltage access line VSSBA connected to a common voltage pin located in the pin area PADA, a common voltage connecting line VSSBC located on both sides of the display area AA (both sides in the row direction), and a common voltage relay wire VSSBB connecting the common voltage access line VSSBA and the common voltage connecting line VSSBC. Both sides of the common electrode may be connected to the common voltage connecting line VSSBC, so that the common voltage applied to the common electrode pin may be applied to the common electrode.

In one example, referring to FIG. 5, the width of the common voltage access line VSSBA is smaller than the width of the common voltage relay wire VSSBB; when the touch wiring TSW is wired, it may be located on the common voltage bus VSSB, so as to reduce the interference of display panel PNL and improve the accuracy of touch signals. The touch wiring TSW adjacent to the pin area PADA may extend beyond the range of the common voltage relay wire VSSBB and into the pin area PADA, so as to facilitate the connection of the touch pin PAD located in the pin area PADA. In this way, the touch signal generated in the touch channel TS may be transmitted to the touch pin PAD through the touch wiring TSW; when each pin in the pin area PADA is connected to the control module, for example, connected to the control module through a flexible circuit board, the touch signal on the touch channel TS may be transmitted to the control module.

Figure 8:
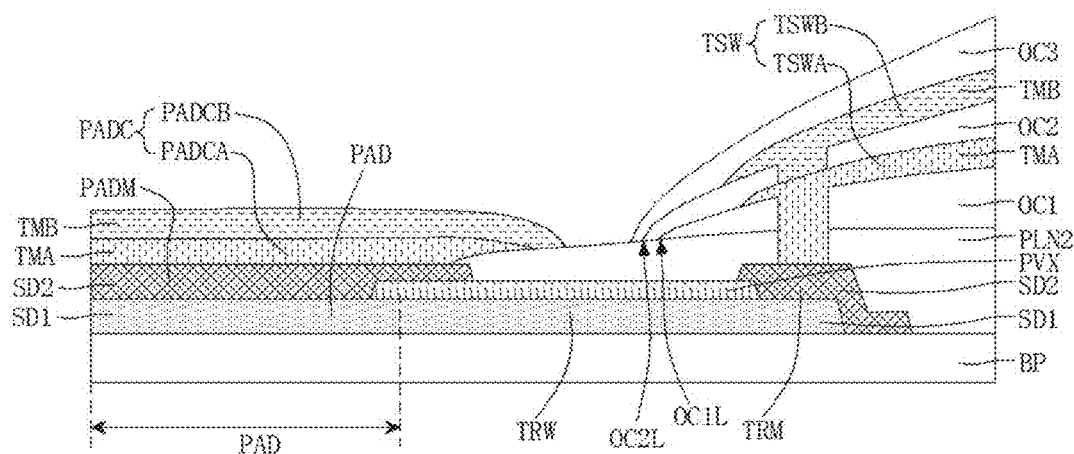
FIG. 8 is a schematic structural diagram of a display panel adjacent to a pin area according to some embodiments of this disclosure.

In some embodiments of this disclosure, referring to FIG. 8, the touch wiring TSW includes a first touch wiring TSWA and a second touch wiring TSWB connected to the same touch channel TS, the first touch wiring TSWA is located on the first touch metal layer TMA, and the second touch wiring TSWB is located on the second touch metal layer TMB. An end of the second touch wiring TSWB away from the touch channel TS is connected to the first touch wiring TSWA through a via hole. In this way, the touch wiring TSW includes two sub-wirings arranged in parallel, which can reduce the impedance of the touch wiring TSW to ensure effective transmission of touch signals. Further, the extension traces of the first touch wiring TSWA and the second touch wiring TSWB are basically the same, so that they overlap each other. One or more connecting vias may be provided between the first touch wiring TSWA and the second touch wiring TSWB as required, backing up each other, so that the connection between the first touch wiring TSWA and the second touch wiring TSWB is more reliable, thereby improving the stability of the touch wiring TSW.

Figure 6:
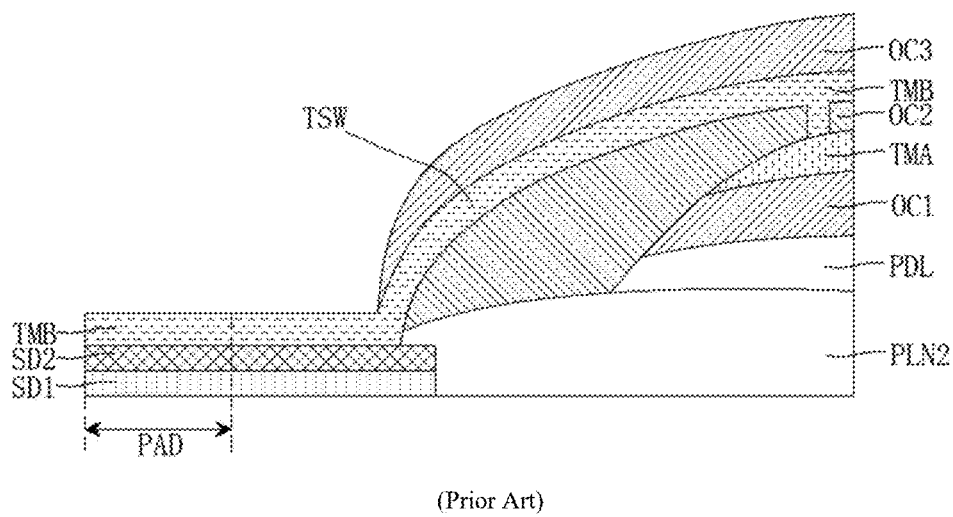
FIG. 6 is a schematic structural diagram of a display panel adjacent to a pin area in the related art.
Figure 7:
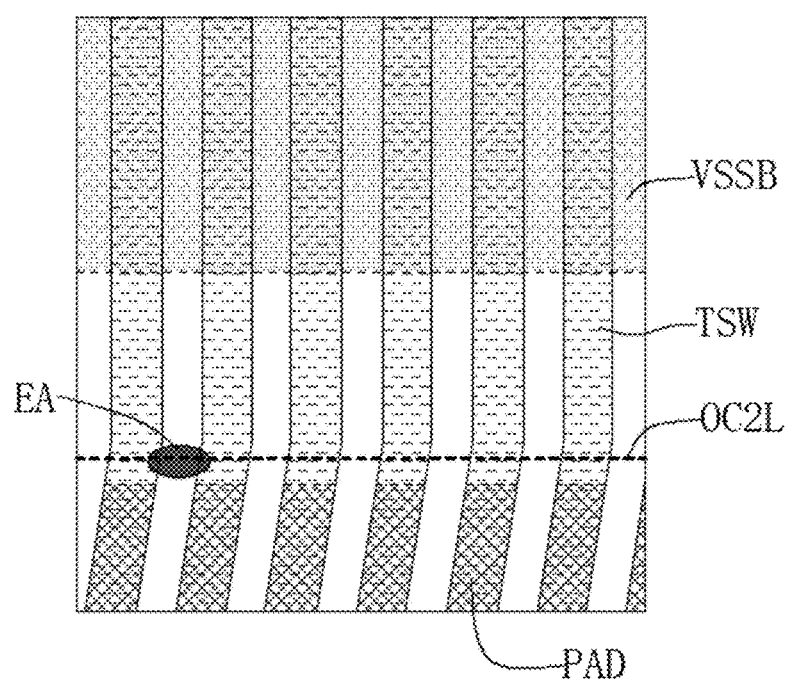
FIG. 7 is a schematic structural diagram of a display panel adjacent to a pin area in the related art.

In related art, referring to FIG. 6 and FIG. 7, at the end of the touch wiring TSW close to the touch pin PAD, the touch wiring TSW may only be arranged in the second touch metal layer TMB; and the touch wiring TSW may protrude out of the third touch organic layer OC3 and be connected to the touch pin PAD. However, since various organic layers such as the second touch organic layer OC2 and the first touch organic layer OC1 are disposed under the second touch metal layer TMB (on the side close to the base substrate BP), this makes the slope at the edge OC2L of the second touch organic layer relatively large, and conductive material remaining is easily formed at the edge OC2L (e.g., in the area EA of FIG. 7) of the second touch organic layer when preparing the touch wiring TSW by patterning the second touch metal layer TMB, which makes short circuit easy to occur between the touch wirings TSW.

Figure 9:
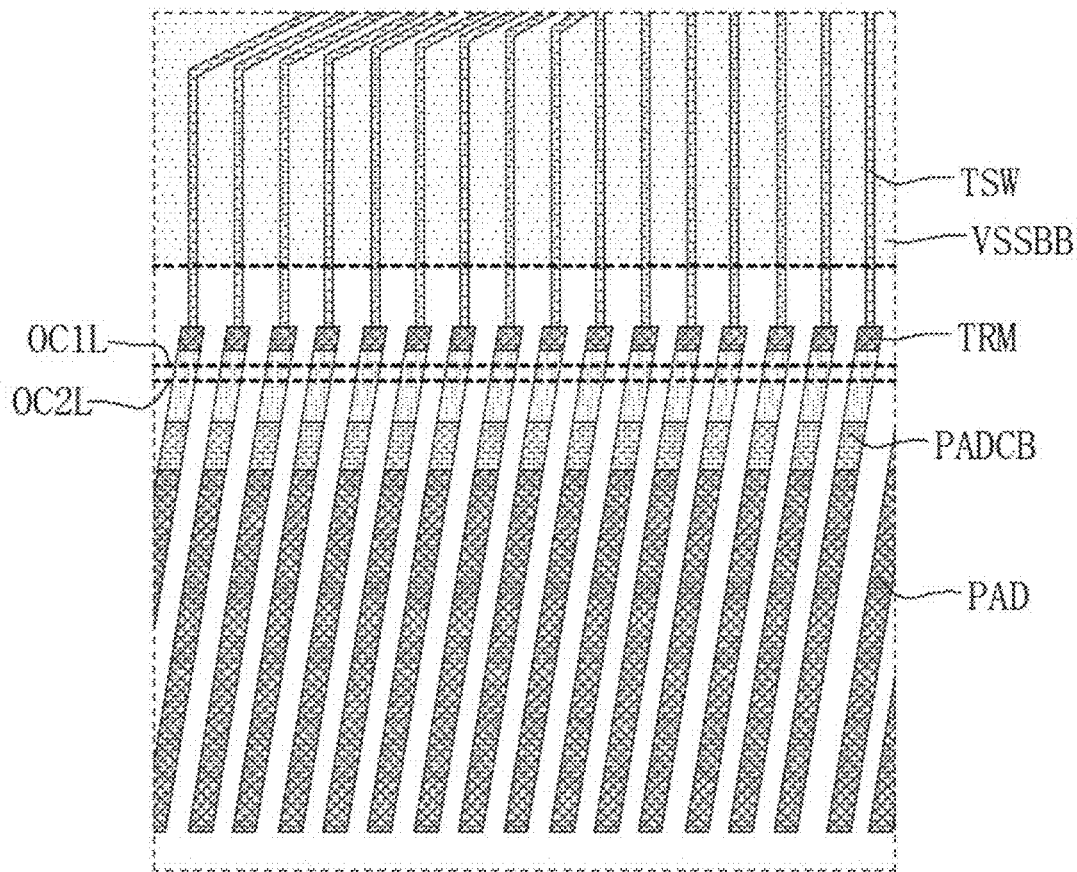
FIG. 9 is a schematic structural diagram of a display panel adjacent to a pin area according to some embodiments of this disclosure.

According to some embodiments of this disclosure, referring to FIG. 8 and FIG. 9, the touch organic layer OC exposes the touch pin PAD, and an end of the touch relay wire TRW far away from the touch pin PAD extends between the touch organic layer OC and the base substrate BP; the touch wiring TSW does not protrude out of the touch organic layer OC, and the touch wiring TSW is electrically connected with an end of the touch relay wire TRW through a via hole. In this way, in the display panel PNL according to some embodiments of this disclosure, the touch wiring TSW is not directly connected to the touch pin PAD, but is indirectly connected to the touch pin PAD through the touch relay wire TRW located in the driving layer FA. This can prevent the touch relay wire TRW from being short-circuited due to a too large slope at the edge OC1L of the first touch organic layer or the edge OC2L of the second touch organic layer when the touch relay wire TRW extends out of the touch organic layer OC, and further ensures that the signal of the touch channel TS may be effectively transmitted to the touch pin PAD.

In some embodiments of this disclosure, the second touch organic layer OC2 covers the edge of the first touch organic layer OC1, which can reduce the slope at the edge of the second touch organic layer OC2, thereby reducing the risk of short circuit for the second touch wiring TSWB near the edge of the second touch organic layer OC2.

Figure 11:
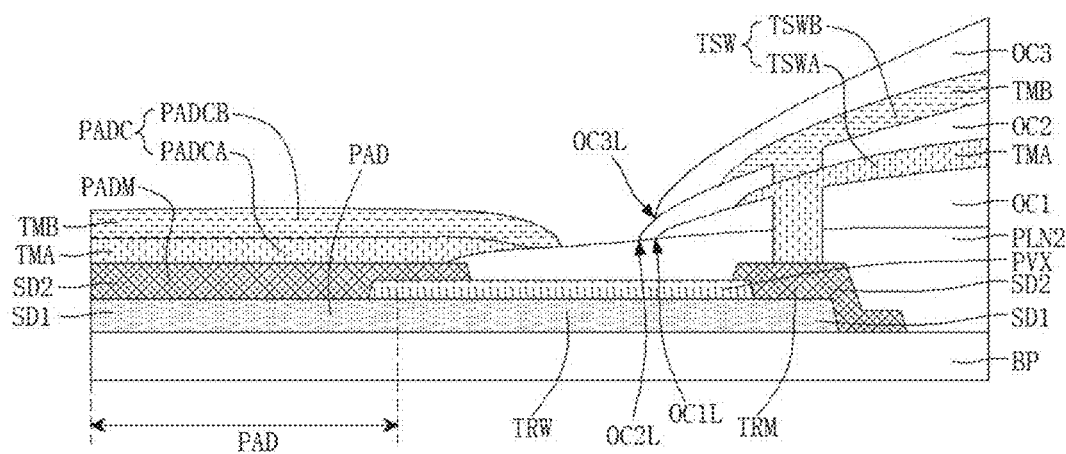
FIG. 11 is a schematic structural diagram of a display panel adjacent to a pin area according to some embodiments of this disclosure.

In some embodiments of this disclosure, referring to FIG. 11, the edge OC3L of the third touch organic layer OC3 and the edge OC1L of the first touch organic layer OC1 may be flush, so the third touch organic layer OC3 and the first touch organic layer OC1 may share a mask, thereby reducing the manufacturing cost of the display panel.

In some embodiments of this disclosure, referring to FIG. 8, the end of the first touch wiring TSWA away from the touch channel TS is electrically connected to the touch relay wire TRW through a via hole, and the end of the second touch wiring TSWB away from the touch channel TS is connected to the first touch wiring TSWA through a via hole.

In some embodiments of this disclosure, referring to FIG. 8, the driving layer FA is provided with a common voltage bus VSSB between the touch pin PAD and the display area AA of the display panel PNL (e.g., the common voltage relay wire VSSBB in FIG. 9), and the common voltage bus VSSB is configured to load the common voltage to the pixel layer FB. The via hole between the touch relay wire TRW and the touch wiring TSW is located between the common voltage bus VSSB and the touch pin PAD. In this way, the touch wiring TSW may be shielded and protected by the common voltage bus VSSB as much as possible.

In some embodiments of this disclosure, the touch relay wire TRW is located on the source-drain metal layer SD; and a part of the touch relay wire TRW located between the touch pin PAD and the touch organic layer OC is covered by the passivation layer PVX. Further, an edge of the part of the touch relay wire TRW between the touch pin PAD and the touch organic layer OC is covered by the passivation layer PVX.

In some embodiments of this disclosure, referring to FIG. 8, the source-drain metal layer SD includes a first source-drain metal layer SD1 and a second source-drain metal layer SD2 stacked in sequence, and a passivation layer PVX is sandwiched between the first source-drain metal layer SD1 and the second source-drain metal layer SD2. The touch relay wire TRW is disposed on the first source-drain metal layer SD1; the part of the touch relay wire TRW between the touch pin PAD and the touch organic layer OC is covered by the passivation layer PVX. In particular, the edge of the part of the touch relay wire TRW between the touch pin PAD and the touch organic layer OC is covered by the passivation layer PVX. In this way, the touch relay wire TRW is protected by the passivation layer PVX. When the first touch metal layer TMA and the second touch metal layer TMB are patterned by etching, the part of the touch relay wire TRW between the touch pin PAD and the touch organic layer OC may be not corroded, thereby especially preventing the edge of the touch relay wire TRW from being corroded.

In some embodiments of this disclosure, referring to FIG. 8, the second source-drain metal layer SD2 includes transfer metal parts TRM corresponding to respective touch relay wires TRW one by one, and the end of the touch relay wire TRW far away from the touch pin PAD is connected to a corresponding one of the transfer metal parts TRM. The end of the touch wiring TSW far away from the touch channel TS is connected to the touch transfer wire TRW through the transfer metal part TRM. In this way, the transfer metal part TRM can protect the touch relay wire TRW on the one hand, and reduce the step difference between the first touch metal layer TMA and the touch relay wire TRW on the other hand, so as to avoid circuit-break of the first touch wiring TSWA in the via hole for being connected to the transfer metal part TRM.

In some embodiments of this disclosure, referring to FIG. 8, the transfer metal part TRM is overlapped on an end of the touch relay wire TRW away from the touch pin PAD; and a part of the touch relay wire TRW not overlapped with the transfer metal part TRM is covered by the passivation layer PVX. In this way, the touch relay wire TRW can be protected by the passivation layer PVX and the second source-drain metal layer SD2, thereby preventing the touch relay wire TRW from corrosion during the patterning of the first touch metal layer TMA and the second touch metal layer TMB. Further, referring to FIG. 10, in the part of the touch relay wire TRW not covered by the second source-drain metal layer SD2, the passivation layer PVX covers the edge thereof, so as to avoid side corrosion of the touch relay wire TRW.

According to some embodiments of this disclosure, the second source-drain metal layer SD2 include laminated metal parts PADM corresponding to respective touch pins PAD one by one, and the laminated metal part PADM is overlapped and electrically connected with a corresponding one of the touch pins. In this way, the laminated metal part PADM can protect the touch pin PAD. Further, an orthographic projection of the touch pin PAD on the base substrate BP is located within an orthographic projection of the laminated metal part PADM on the base substrate BP.

Figure 10:
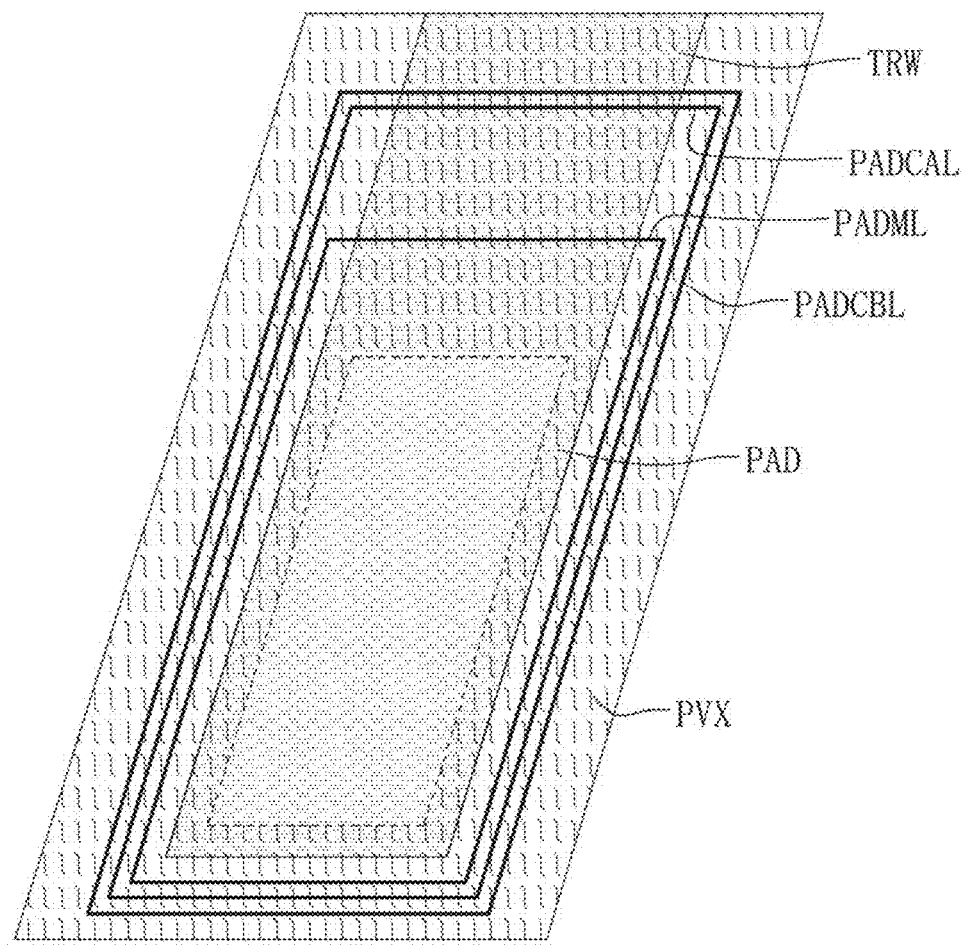
FIG. 10 is a schematic structural diagram of metal layers on touch pins according to some embodiments of this disclosure.

In one example, referring to FIG. 10, the passivation layer PVX covers the edge of the touch pin PAD, and has one or more opening grooves exposing a partial surface of the touch pin PAD. The line PADML in FIG. 10 represents the edge of the laminated metal part PADM located in the second source-drain metal layer SD2. According to the example of FIG. 10, the laminated metal part PADM covers each opening groove and covers each edge of the touch pin PAD. In this way, the laminated metal part PADM is connected to the touch pin PAD through the opening groove, and the touch pin PAD can be prevented from side corrosion at its edge during the etching process of the second source-drain metal layer SD2.

In some embodiments of this disclosure, referring to FIG. 8, the touch metal layer TM further includes pin protection parts PADC corresponding to respective touch pins PAD one by one, and the pin protection part PADC is connected to a corresponding one of the touch pins PAD. The touch pin PAD is overlapped and electrically connected with a corresponding one of the touch pins. A gap exists between the pin protection part and an edge of the touch organic layer In this way, during the patterning process of the touch metal layer TM, the pin protection part PADC can protect the touch pin PAD and reduce corrosion to the touch pin PAD. At the same time, the gap exists between the pin protection part PADC and the edge of the touch organic layer OC, which makes the touch metal layer TM discontinuous at the edge of the touch organic layer OC, so even if there is remaining conductive material at edges of the touch organic layer OC, it may not lead to electrical connection between different pin protection parts PADC, thereby avoiding the short circuit between the touch pins PAD while ensuring the protection of the touch pins PAD. Further, the orthographic projection of the touch pin PAD on the base substrate BP is located within the orthographic projection of the pin protection part PADC on the base substrate BP; that is, the pin protection part PADC can completely cover the touch pin PAD.

In one example, referring to FIG. 8 and FIG. 10, the pin protection part PADC includes a first pin protection part PADCA located on the first touch metal layer TMA and a second pin protection part PADCB located on the second touch metal layer TMB. In FIG. 10, the line PADCAL represents the edge of the first pin protection part PADCA, and the line PADCBL represents the edge of the second pin protection part PADCB. Referring FIG. 10, the orthographic projection of the touch pin PAD on the base substrate BP is within an orthographic projection of the first pin protection part PADCA on the base substrate BP; and the orthographic projection of the first pin protection part PADCA on the base substrate BP is within the orthographic projection of the second pin protection part PADCB on the base substrate BP.

Furthermore, the orthographic projection of the touch pin PAD on the base substrate BP is within the orthographic projection of the laminated metal part PADM on the base substrate BP; and the orthographic projection of the laminated metal part PADM on the base substrate BP is within the orthographic projection of the first pin protection part PADCA on the base substrate BP.

In this way, the laminated metal part PADM covers the edge of the touch pin PAD, so when the second source-drain metal layer SD2 is patterned by etching, a sidewall of the touch pin PAD can be avoided from side corrosion. The first pin protection part PADCA covers the edge of the laminated metal part PADM, so when the first touch metal layer TMA is patterned by etching, sidewalls of the touch pin PAD and the laminated metal part PADM can be avoided from side corrosion. The second pin protection part PADCB covers the edge of the first pin protection part PADCA, so when the second touch metal layer TMB is patterned by etching, sidewalls of the touch pin PAD, the laminated metal part PADM and the first pin protection part PADCA can be avoided from side corrosion.

According to some embodiments of this disclosure, the second touch organic layer OC2 is not provided between the first pin protection part PADCA and the second pin protection part PADCB; and the first touch organic layer OC1 is not provided between the first pin protection part PADCA and the touch pin PAD. In other words, the touch organic layer OC may not extend into the pin area PADA. This avoids the conflict between the touch organic layer OC using a low-temperature process and the high temperature during bonding, and avoids defection of the touch organic layer OC in the pin area PADA during bonding. In addition, when the adhesion of the material (e.g., the organic layer in the driving layer FA) between the touch organic layer OC and the material of the driving layer FA is weak, this configuration can also reduce the risk of film peeling. Also, in some cases, at least one film layer in the touch organic layer OC, such as the first touch organic layer OC1 and the second touch organic layer OC2, may be formed relatively thick. If these film layers also extend into the pin area PADA, these films may need to be opened with through holes to make the metals of the upper and lower layers electrically connected. However, thick films may need to be opened with relatively large through holes to affect the arrangement density of the pins, and metal layers in the deep through holes are prone to be broken circuited. These may reduce the yield and reliability of the display panel PNL. In some embodiments, these risks are avoided by not disposing the touch organic layer OC in the pin area PADA. Exemplarily, in some other embodiments of this disclosure, if necessary, the touch organic layer OC may also be disposed on at least a partial area of the pin area PADA.

In some embodiments of this disclosure, the driving layer FA further includes a planarization layer PLN located on the side of the second source-drain metal layer SD2 away from the base substrate BP; and the planarization layer PLN covers the gap between the laminated metal part PADM and the boundary of the touch organic layer OC. In this way, the touch organic layer OC may be raised at the boundary thereof, and the step difference near the boundary of the touch organic layer OC may be reduced, thereby reducing the risk of conductive material residue caused by patterning near the boundaries of the first touch metal layer TMA and the second touch metal layer TMB. For example, the risk of short circuit between different first touch wirings TSWA can be reduced, the risk of short circuit between different second touch wirings TSWB can be reduced, the risk of short circuit between adjacent first pin protection parts PADCA can be reduced, and the risk of short circuit between second pin protection parts PADCB can be reduced.

Further, the touch organic layer OC covers a part of the touch relay wire TRW, and is directly formed on a surface of the planarization layer PLN away from the base substrate BP.

Further, there is a gap between the pin protection part PADC and the edge of the touch organic layer OC, and a part of the pin protection part PADC close to the touch organic layer OC is overlapped on the planarization layer PLN.

As an example, the display panel PNL is provided with a second planarization layer PLN2 between the second source-drain metal layer SD2 and the pixel layer FB, and the second planarization layer PLN2 covers the gap between the boundary of the touch organic layer OC and the laminated metal part PADM. Near the boundary of the touch organic layer OC, the touch organic layer OC is directly disposed on the upper surface of the second planarization layer PLN2. The part of the pin protection part PADC close to the touch organic layer OC is overlapped on the second planarization layer PLN2.

Some embodiments of this disclosure further provide a display device, which includes the display panel PNL described in any of the above embodiments of display panel. The display device may be a smart phone screen, a smart watch screen or other types of display devices. Since the display device has the display panel PNL described in any of the above embodiments of display panel PNL, they have the same beneficial effect, which will not be repeated here.

Other embodiments of this disclosure will be readily apparent to those skilled in the art from consideration of the specification and practice of the invention disclosed herein. This application is intended to cover any modification, use or adaptation of this disclosure, and these modifications, uses or adaptations follow the general principles of this disclosure and include common knowledge or conventional technical means in the technical field not disclosed in this disclosure. The specification and embodiments are to be considered exemplary only, with the actual scope and spirit of the disclosure being indicated by the appended claims.

What is claimed is:

1. A display panel, comprising a base substrate, a driving layer, a pixel layer and a touch layer stacked sequentially; wherein, in a peripheral area of the display panel, the driving layer is provided with a touch pin and a touch relay wire connected with the touch pin; the driving layer comprises a source-drain metal layer and a passivation layer for protecting the source-drain metal layer; the source-drain metal layer comprises a first source-drain metal layer and a second source-drain metal layer sequentially stacked on a side of the base substrate, and the passivation layer is located between the first source-drain metal layer and the second source-drain metal layer; the touch layer comprises a touch organic layer and a touch metal layer buried in the touch organic layer, and the touch metal layer is formed with a touch channel and a touch wiring connected with the touch channel;

wherein, the touch organic layer exposes the touch pin, and an end of the touch relay wire away from the touch pin extends between the touch organic layer and the base substrate;

a part of the touch relay wire between the touch pin and the touch organic layer is covered by the passivation layer;

the touch relay wire is located in the first source-drain metal layer; the second source-drain metal layer comprises transfer metal parts corresponding to respective touch relay wires one by one, and the end of the touch relay wire away from the touch pin is connected with a corresponding one of the transfer metal parts; and the touch wiring does not protrude out of the touch organic layer, and an end of the touch wiring away from the touch channel is electrically connected to the end of the touch relay wire away from the touch pin through the transfer metal part.

2. The display panel according to claim 1, wherein the touch organic layer comprises a first touch organic layer, a second touch organic layer and a third touch organic layer sequentially stacked on a side of the pixel layer away from the base substrate; the touch metal layer comprises a first touch metal layer sandwiched between the first touch organic layer and the second touch organic layer, and a second touch metal layer sandwiched between the second touch organic layer and the third touch organic layer.

3. The display panel according to claim 2, wherein the touch channel is formed on the second touch metal layer and the first touch metal layer; the touch wiring comprises a first touch wiring and a second touch wiring connected with a same touch channel, the first touch wiring is located in the first touch metal layer, the second touch wiring is located in the second touch metal layer; an end of the first touch wiring away from the touch channel is electrically connected to the end of the touch relay wire away from the touch pin through the transfer metal part, and an end of the second touch wiring away from the touch channel is electrically connected to the end of the first touch wiring away from the touch channel through the transfer metal part.

4. The display panel according to claim 1, wherein the driving layer is provided with a common voltage bus between the touch pin and a display area of the display panel, and the common voltage bus is configured to load a common voltage to the pixel layer;

the transfer metal part between the touch relay wire and the touch wiring is located between the common voltage bus and the touch pin.

5. The display panel according to claim 1, wherein the transfer metal part is overlapped on the end of the touch relay wire away from the touch pin; and a part of the touch relay wire not overlapped with the transfer metal part is covered by the passivation layer.

6. The display panel according to claim 1, wherein the touch metal layer further comprises pin protection parts corresponding to respective touch pins one by one, the pin protection part is overlapped and electrically connected with a corresponding one of the touch pins;

and a gap exists between the pin protection part and an edge of the touch organic layer.

7. The display panel according to claim 6, wherein an orthographic projection of the touch pin on the base substrate is located within an orthographic projection of the pin protection part on the base substrate.

8. The display panel according to claim 6, wherein the touch organic layer comprises a first touch organic layer, a second touch organic layer and a third touch organic layer sequentially stacked on a side of the pixel layer away from the base substrate; the touch metal layer comprises a first touch metal layer sandwiched between the first touch organic layer and the second touch organic layer, and a second touch metal layer sandwiched between the second touch organic layer and the third touch organic layer;

the pin protection part comprises a first pin protection part located on the first touch metal layer and a second pin protection part located on the second touch metal layer;

an orthographic projection of the touch pin on the base substrate is located within an orthographic projection of the first pin protection part on the base substrate; and the orthographic projection of the first pin protection part on the base substrate is located within an orthographic projection of the second pin protection part on the base substrate.

9. The display panel according to claim 8, wherein the second touch organic layer is not provided between the first pin protection part and the second pin protection part; and the first touch organic layer is not provided between the first pin protection part and the touch pin.

10. The display panel according to claim 1, wherein the touch pin is located in the first source-drain metal layer;

the second source-drain metal layer comprises laminated metal parts corresponding to respective touch pins one by one, and the laminated metal part is overlapped and electrically connected with a corresponding one of the touch pins.

11. The display panel according to claim 10, wherein an orthographic projection of the touch pin on the base substrate is located within an orthographic projection of the laminated metal part on the base substrate.

12. The display panel according to claim 10, wherein the driving layer further comprises a planarization layer located on a side of the second source-drain metal layer away from the base substrate; and the planarization layer covers a gap between the laminated metal part and a boundary of the touch organic layer.

13. The display panel according to claim 12, wherein a part of the touch organic layer covering the touch relay wire is directly formed on a surface of the planarization layer away from the base substrate.

14. The display panel according to claim 12, wherein the touch metal layer further comprises pin protection parts corresponding to respective touch pins one by one, and the pin protection part is overlapped and electrically connected with a corresponding one of the touch pins through the laminated metal part;

a gap exists between the pin protection part and an edge of the touch organic layer, and a part of the pin protection part close to the touch organic layer is overlapped on the planarization layer.

15. The display panel according to claim 10, wherein the touch metal layer further comprises pin protection parts corresponding to respective touch pins one by one, and the pin protection part is overlapped and electrically connected with a corresponding one of the touch pins through the laminated metal part;

wherein, an orthographic projection of the laminated metal part on the base substrate is located within an orthographic projection of the pin protection part on the base substrate.

16. The display panel according to claim 1, further comprising a thin-film encapsulation layer located between the pixel layer and the touch layer, and the thin-film encapsulation layer comprises an inorganic encapsulation layer and an organic encapsulation layer stacked alternately, and the thin-film encapsulation layer comprises at least one organic encapsulation layer and at least two inorganic encapsulation layers.

17. A display device, comprising a display panel, wherein the display panel comprises a base substrate, a driving layer, a pixel layer and a touch layer stacked sequentially; wherein, in a peripheral area of the display panel, the driving layer is provided with a touch pin and a touch relay wire connected with the touch pin; the driving layer comprises a source-drain metal layer, and a passivation layer for protecting the source-drain metal layer; the source-drain metal layer comprises a first source-drain metal layer and a second source-drain metal layer sequentially stacked on a side of the base substrate, and the passivation layer is located between the first source-drain metal layer and the second source-drain metal layer; the touch layer comprises a touch organic layer and a touch metal layer buried in the touch organic layer, and the touch metal layer is formed with a touch channel and a touch wiring connected with the touch channel;

wherein, the touch organic layer exposes the touch pin, and an end of the touch relay wire away from the touch pin extends between the touch organic layer and the base substrate;

a part of the touch relay wire between the touch pin and the touch organic layer is covered by the passivation layer;

the touch relay wire is located in the first source-drain metal layer; the second source-drain metal layer comprises transfer metal parts corresponding to respective touch relay wires one by one, and the end of the touch relay wire away from the touch pin is connected with a corresponding one of the transfer metal parts; and the touch wiring does not protrude out of the touch organic layer, and an end of the touch wiring away from the touch channel is electrically connected to the end of the touch relay wire away from the touch pin through the transfer metal part.

18. The display device according to claim 17, wherein the touch organic layer comprises a first touch organic layer, a second touch organic layer and a third touch organic layer sequentially stacked on a side of the pixel layer away from the base substrate; the touch metal layer comprises a first touch metal layer sandwiched between the first touch organic layer and the second touch organic layer, and a second touch metal layer sandwiched between the second touch organic layer and the third touch organic layer.

* * * * *